United States Patent
Hung et al.

(10) Patent No.: US 8,218,658 B2
(45) Date of Patent: Jul. 10, 2012

(54) METHOD FOR OFDM AND OFDMA CHANNEL ESTIMATION

(75) Inventors: Kun-Chien Hung, Hsinchu (TW);
David W. Lin, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 721 days.

(21) Appl. No.: 12/118,063

(22) Filed: May 9, 2008

(65) Prior Publication Data

US 2009/0232230 A1 Sep. 17, 2009

(30) Foreign Application Priority Data

Mar. 11, 2008 (TW) ................................ 97108535 A

(51) Int. Cl.
*H04L 27/28* (2006.01)
(52) U.S. Cl. .................... 375/260; 375/259; 370/344
(58) Field of Classification Search .................. 375/260, 375/259; 370/344
See application file for complete search history.

(56) References Cited

U.S. PATENT DOCUMENTS

| 2004/0190438 A1* | 9/2004 | Maltsev et al. ............... 370/206 |
| 2006/0239178 A1 | 10/2006 | Svensson et al. |
| 2007/0183521 A1 | 8/2007 | Cheng et al. |

OTHER PUBLICATIONS

Hsieh, et al. "Channel Estimation for OFDM Systems Based on Comb-Type Pilot Arrrangement in Frequency Selective Fadding Channels", IEEE Transactions on Consumer Electronics, vol. 44, No. 1, pp. 217-225, 1998.

* cited by examiner

*Primary Examiner* — Shuwang Liu
*Assistant Examiner* — Michael Neff
(74) *Attorney, Agent, or Firm* — Muncy, Geissler, Olds & Lowe, PLLC

(57) ABSTRACT

This invention discloses a method for OFDM and OFDMA channel estimation via phase-rotated polynomial interpolation and extrapolation (inter/extra-polation). For complexity reason, polynomial inter/extra-polation is an often considered method for channel estimation in orthogonal frequency-division multiplexing (OFDM) and orthogonal frequency-division multiple access (OFDMA) systems, in which the simplest choice is linear inter/extra-polation. But the performance of this method depends on the accuracy of symbol timing estimation as well as the channel delay spread. The invention mitigates the problem by adding a linear phase factor to polynomial inter/extra-polation, which corresponds to adding a delay (also called delay shift) in the time domain.

15 Claims, 3 Drawing Sheets

METHOD FOR OFDM AND OFDMA CHANNEL ESTIMATION

BACKGROUND OF THE INVENTION

1. Field of the Invention

The present invention relates to a method for channel estimation in a communication system, particularly to a method for OFDM and OFDMA channel estimation via phase-rotated polynomial interpolation and extrapolation.

2. Description of the Prior Art

There exist various electronic products today for wireless communication, including mobile phones, wireless metropolitan area network (WMAN), wireless local area network (WLAN), global positioning system (GPS), Bluetooth, and so on. Besides convenience of use, size, and external appearance, their performance is unsurprisingly a focus point that must be attended to in associated research and development. It also goes without saying that, in this, the technology relating to baseband signal transmitting and receiving components, which play a critical role in the overall transceiver operation, is of great importance.

Channel estimation algorithms play an important role in transceiver design for wireless communication systems based on orthogonal frequency-division multiplexing (OFDM), orthogonal frequency-division multiple access (OFDMA), etc. Various forms of channel estimation algorithms can be designed for various pilot carrier (also called pilot subcarrier) configurations and various channel characteristics, resulting in a significant number of channel estimation algorithms employing various methodologies and with various realization complexities.

United States Patent Application No. 2007/0183521 titled "Method of channel estimation" discloses a technique that divides a frequency response into an amplitude response and a phase response for channel estimation. It estimates the amplitude response and the phase response separately and combines them into a channel response. Various interpolation and extrapolation (henceforth abbreviated inter/extra-polation) methods, e.g. linear inter/extra-polation or various weighted inter/extra-polation methods, can be used in the estimation of amplitude and phase responses. Because of the need to estimate amplitude and phase responses, this method requires the non-linear coordinate conversion from polar coordinates to rectangular coordinates for each subcarrier where the channel response is to be estimated.

United States Patent Application No. 2006/0239178 A1 titled "Reduced complexity channel estimation in OFDM systems" considers the processing of received signal. Observing that transmission delay causes phase rotation in the received signal, the method counter-rotates the received signal at each subcarrier to a channel delay appropriate for channel estimation prior to performing the channel estimation for the subcarriers. The algorithm seeks to lower the effect of signal phase rotation before channel estimation. It is based on heuristic reasoning without a mathematically clearly formulated quality measure and it needs to apply a different amount of phase rotation to each subcarrier.

M.-H. Hsieh and C.-H. Wei's "Channel estimation for OFDM systems based on come-type pilot arrangement in frequency selective fading channels" (IEEE Trans. Consumer Elec., vol. 44, no. 1, pp 217-225, February 1998) proposed a linear interpolation with phase compensation for combined multicarrier symbol timing and channel response estimation to mitigate the linear interpolation error caused by channel transmission delay. However, the amount of phase rotation is estimated in an ad hoc and heuristic manner, lacking a proper theoretical foundation and neither being an optimal solution.

In contrast, the present invention derives the theoretically optimal values and proposes several methods to estimate the optimal values.

In addition, for linear inter/extra-polation and, more generally, for polynomial inter/extra-polation, the performance depends on the accuracy of symbol timing estimation and the amount of channel delay spread. Inaccurate symbol timing estimation results in relatively long channel delay, which, similar to excessive channel delay spread, would cause severe model error in linear inter/extra-polation and general polynomial inter/extra-polation. This phenomenon is an important design issue in system implementation. Take OFDMA uplink transmission, for example. Because multiple users transmit their symbols according to a common timing plan whereas different users experience different propagation delays, a ranging process is often employed to adjust the uplink transmission delays so as to attain accurate symbol timing synchronization among all users. If the channel estimation algorithm could take into consideration the effect of different propagation delays of different users and handle it properly, then it could reduce the required accuracy in symbol time synchronization of the ranging process.

SUMMARY OF THE INVENTION

To solve the above-mentioned problems, one objective of the present invention is to provide for OFDM and OFDMA types of communication systems a channel estimation method wherein phase-rotated polynomial interpolation and extrapolation are employed, with the amount of phase rotation determined from estimating an optimal value. The method improves effectively the transmission performance in situations with inaccurate symbol timing estimation, relatively long channel delay, or relatively large channel delay spread.

Another objective of the present invention is the channel estimation in WiMAX (Worldwide Interoperability for Microwave Access) transmission. Through estimating the transmission delay and through channel estimation via phase-rotated polynomial inter/extra-polation, the model error caused by long transmission delay and large delay spread can be mitigated or even eliminated to yield optimal polynomial inter/extra-polation.

To achieve the above-mentioned objectives, one embodiment of the present invention provides a method for channel estimation in a multicarrier communication system, which receives a signal over the transmission channel and conducts channel estimation in a communication system based on orthogonal frequency-division multiplexing (OFDM) or orthogonal frequency-division multiple access (OFDMA). The method includes dividing multiple pilot carriers into a plurality of pilot carrier groups organized according to known carrier spacings; calculating an autocorrelation function of channel frequency responses corresponding to the above pilot carrier groups of known spacings by using the multiple pilot carriers; calculating an equivalent cost function from the autocorrelation function; optimizing with the equivalent cost function to obtain an amount of phase rotation corresponding to a delay shift; and substituting the amount of phase rotation into a polynomial inter/extra-polation to estimate channel frequency responses for at least one subcarrier of the transmission channel.

Other advantages of the present invention will become apparent from the following description taken in conjunction with the accompanying drawings wherein are set forth, by way of illustration and example, certain embodiments of the present invention.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
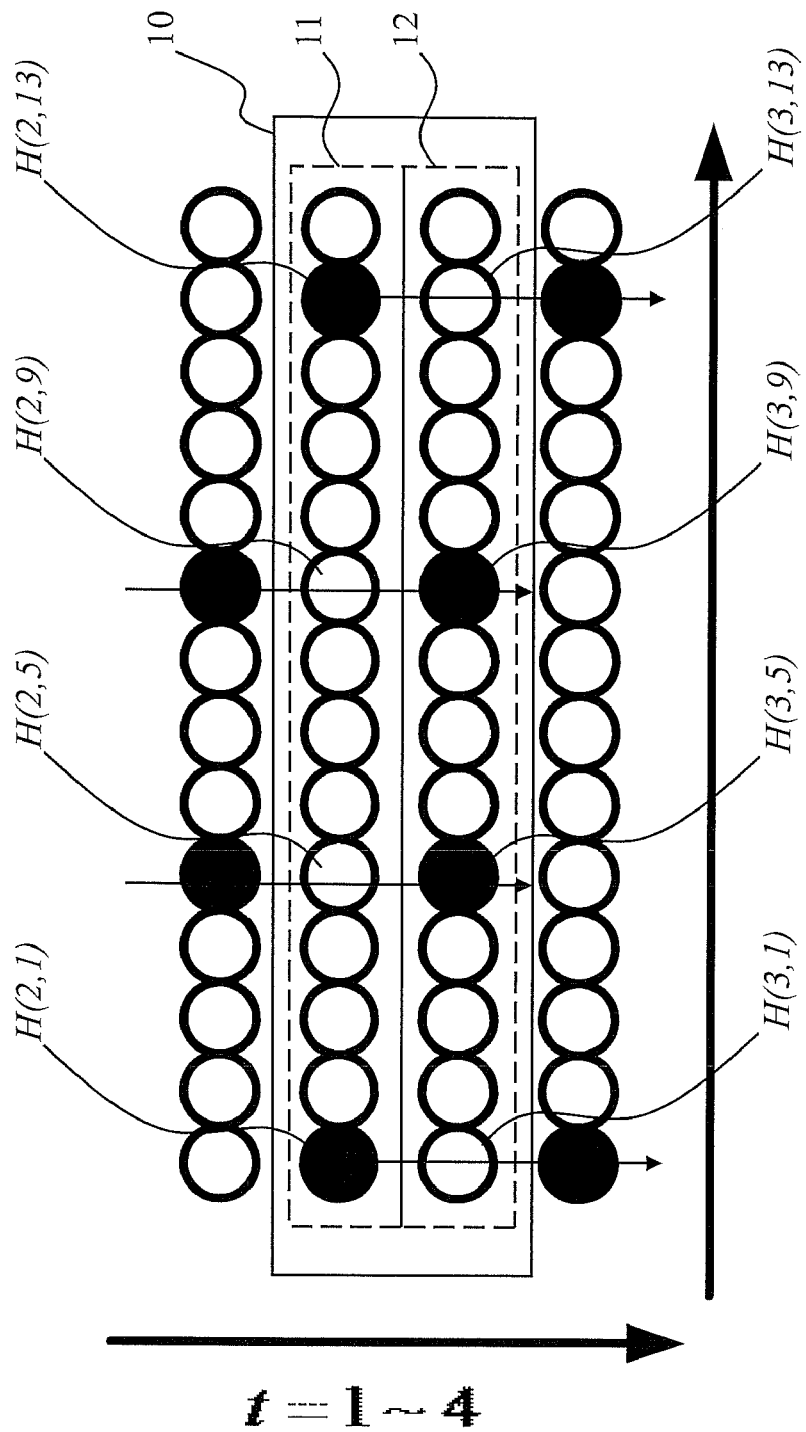
FIG. 1 is a schematic view showing configuration of data and pilot carriers according to one embodiment of the present invention.
Figure 2:
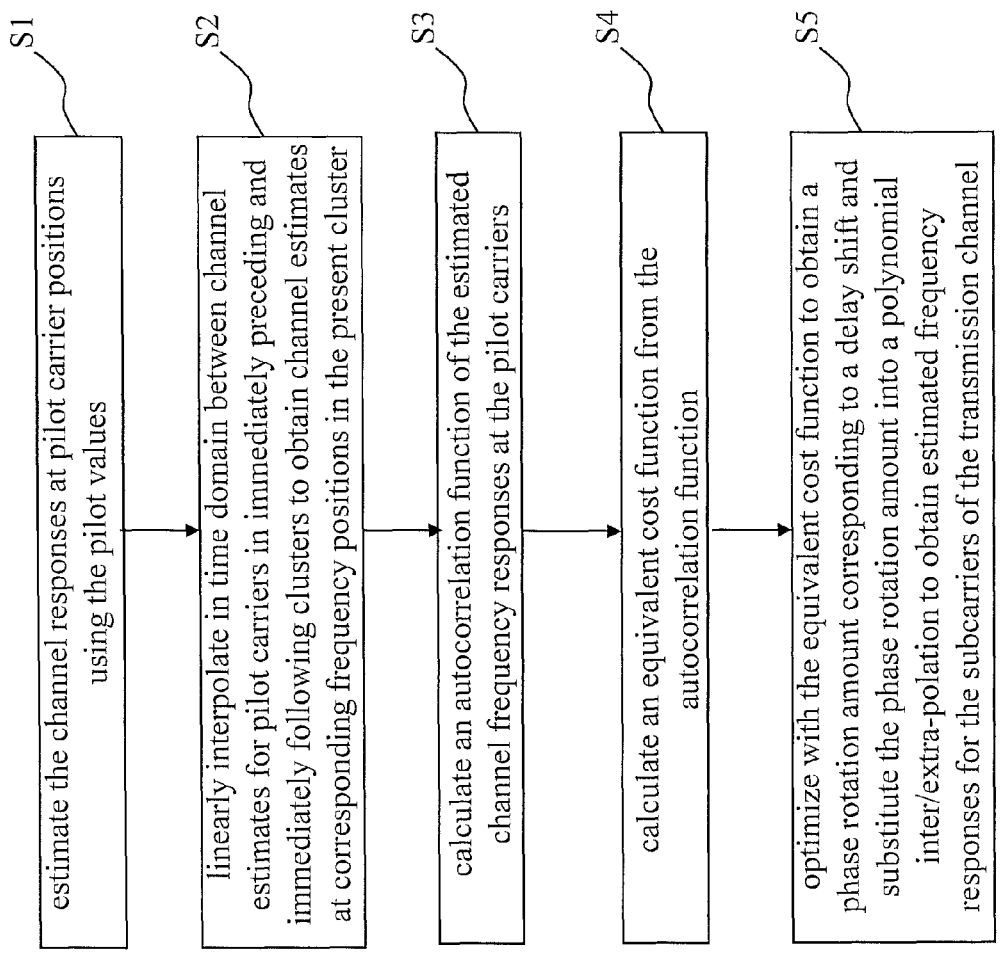
FIG. 2 is a flow chart showing steps according to one embodiment of the present invention.

In multicarrier communication systems, e.g. orthogonal frequency-division multiplexing (OFDM) and orthogonal frequency-division multiple access (OFDMA) systems, polynomial inter/extra-polation is an efficient channel estimation technique, of which the simplest and most basic is the first-order (that is, linear) inter/extra-polation. Take the conventional linear inter/extra-polation channel estimation, as an example. It proceeds as follows: obtaining an initial channel estimate at the pilot carrier positions employing known pilot values (e.g. via least-square estimation method); and then estimating the channel frequency responses at data carriers by linear inter/extra-polation. The linear inter/extra-polation estimates unknown values between or outside the range of two coordinate positions that have known values, and it is given by $$\hat{H}(f+k) = \frac{F-k}{F}\hat{H}(f) + \frac{k}{F}\hat{H}(f+F) \tag{1}$$

where $\hat{H}(f)$ and $\hat{H}(f+F)$ are channel frequency response estimates at two pilot carriers in a set of data carriers, F is pilot subcarrier spacing, and $\hat{H}(f+k)$ is an estimated channel frequency response at a subcarrier position f+k. This method applies to the situation in which the pilot subcarrier spacing is not larger than coherence bandwidth. However, the performance of the linear inter/extra-polation depends on accuracy of symbol timing estimation and amount of channel delay spread. Inaccurate symbol timing estimation would cause longer channel delay which, as excessive channel delay spread, may cause severe model error in linear inter/extra-polation.

The above-mentioned phenomenon is an important design issue in system implementation. Take OFDMA uplink transmission for example. Because multiple users transmit their symbols according to a common timing plan whereas different users experience different propagation delays, a ranging process is often employed to adjust the uplink transmission delays so as to attain accurate symbol timing synchronization among all users. If the channel estimation algorithm could take into consideration the effect of different propagation delays of different users and handle it properly, then it could reduce the required accuracy in symbol time synchronization of the ranging process.

The present invention discloses polynomial interpolation and extrapolation algorithms with phase rotation mechanism to realize channel estimation with reduced model error in the presence of symbol delay and provides methods to estimate the corresponding optimal symbol delay times. In the following, the channel estimation method and the associated delay parameter estimation method are first illustrated for linear inter/extra-polation. Afterwards, they are extended to polynomial inter/extra-polation of higher orders.

A channel impulse response with L paths in a communication system is expressed as $$h(t) = \sum_{l=1}^{L} \alpha_l \delta(t - t_l) \tag{2}$$

where $\alpha_l$ is the channel response of the l-th channel path and $t_l$ is the delay of the l-th channel path. Let $W = e^{-j2\pi/(NT)}$, where N and T are the discrete Fourier transform (DFT) size and the sampling period, respectively. Then the channel frequency response can be expressed as $$H(f) = \sum_{l=1}^{L} \alpha_l W^{t_l f} = W^{t_a f} \overline{H}(f) \tag{3}$$

where f is normalized frequency in units of subcarrier spacing and $$\overline{H}(f) = \sum_{l=1}^{L} \alpha_l W^{(t_l - t_a)f}.$$

The above-mentioned channel frequency response may be regarded as the combination of two functions, namely, a linear phase rotation function $W^{t_a f}$ and a function $\overline{H}(f)$ with reduced frequency variation. With this mathematical channel response model, the present invention obtains a linear inter/extra-polation based on the equation $$\hat{H}(f+k) = \frac{F-k}{F}W^{t_a k}\hat{H}(f) + \frac{k}{F}W^{t_a(k-F)}\hat{H}(f+F) \tag{4}$$

This inter/extra-polation considers simultaneously both linear inter/extra-polation of phase and linear inter/extra-polation of $\overline{H}(f)$ and is called phase-rotated linear interpolation channel estimation (abbreviated RICE).

One core point of (4) is the choice of $t_a$, and different $t_a$ would result in different model errors in channel estimation. From statistical average analysis and the Taylor series expansion of exponential function, the mean square model error in channel estimation can be approximated by $$J = \frac{4\pi^2}{15N^4T^4}F(F+1)(F^2+1)\sum_{l=1}^{L}|\alpha_l|^2(t_a-t_l)^4 \tag{5}$$

The above mean square error (MSE) indicates why simple linear inter/extra-polation bears larger model error: if the $t_a$ is set to 0, then the MSE in linear inter/extra-polated channel estimate is given by $$J = \frac{4\pi^2}{15N^4T^4}F(F+1)(F^2+1)\sum_{l=1}^{L}|\alpha_l|^2 t_l^4 \qquad (6)$$

whose numerical value is proportional to the fourth power sum of each path delay $t_l$; and therefore larger path delays would result in more severe model errors. However, the method of the present invention for selecting the phase-rotation factor can mitigate the model error effectively. In comparison, the prior art of linear inter/extra-polation proposed by Hsieh and Wei is mathematically equivalent to equation (4) of the present invention but with a non-optimal phase rotation factor, while the present invention provides the optimal solution. Furthermore, Hsieh and Wei only considered equally spaced pilot carriers and did not discuss polynomial inter/extra-polation of higher orders.

Next, consider the optimal solution for $t_a$ and how to estimate its numerical value. By differentiation and optimization, the value of $t_a$ that minimizes the MSE can be found to be the solution of the equation $$\sum_{l=1}^{L}|\alpha_l|^2(t_a-t_l)^3 = 0.$$

Concerning the estimation of the optimal $t_a$, first of all, if a transmission frame has one or multiple preambles, then the channel response in the preamble period can be obtained from cross-correlation of the received signal and the preambles. Then the optimal $t_a$ can be obtained from solving the above third-order equation. If the moving speed is low, so that the channel response varies only slowly with time during the transmission process, then the estimated $t_a$ also varies little over a short period of time. In this case, the estimated optimal $t_a$ for the preambles may be used to define the reference delay and phase rotation for the whole frame.

However, the above method is not suitable in some situations, e.g. where transmission frames do not have preambles or where the above-mentioned algorithm is computationally too complex. Then under the following premise, a frequency-domain estimation method can be used: there are three pilot carriers in proximity in frequency (but may be located in temporally different multicarrier symbols) to each subcarrier where the channel frequency response is to be estimated, such as a carrier configuration similar to that of the downlink transmission in the WiMAX OFDMA communication system. In the following description, a case where the pilot carriers are equally spaced in frequency is first discussed, and then the case where the pilots are not equally spaced.

Firstly, consider an equivalent cost function:

$$J' = \left\langle \left|\frac{\partial^2 \overline{H}(f)}{\partial f^2}\right|^2 \right\rangle = 4\pi^4 \sum_{l=1}^{L}(t_a-t_l)^4|\alpha_l|^2 \qquad (7)$$

This modified cost function is equivalent because it and the model MSE are proportional to each other, as can be shown mathematically.

To estimate the optimal delay, if the pilot carriers have equal-spacing placement, then with the estimated channel frequency responses $\hat{H}(f)$, $\hat{H}(f+F)$, and $\hat{H}(f+2F)$ at the pilot carriers and substituting the approximation given in equation (8) into the cost function (7), one obtains that the optimal estimation is the solution that minimizes equation (9).

$$\frac{\partial^2 \overline{H}(f)}{\partial f^2} \approx \frac{\hat{H}(f+2F) - 2\hat{H}(f+F) + \hat{H}(f)}{F^2} \qquad (8)$$

$$J'(\phi) = \Re\{R_2 e^{j2\phi} - 4R_1 e^{j\phi}\} = \cos(2\phi)R_{2r} - \sin(2\phi)R_{2i} - 4\cos(\phi)R_{1r} + 4\sin(\phi)R_{1i} \qquad (9)$$

where $R_m = \langle \hat{H}(k+mF)\hat{H}^*(k)\rangle$, $R_{mr} = \Re\{R_m\}$, $R_{mi} = \Im\{R_m\}$, $\phi = -2\pi t_a F$, $\Im\{\}$ denotes taking the real part of a quantity, $\Im\{\}$ denotes taking the imaginary part of a quantity, f denotes a pilot carrier frequency and $\langle\rangle$ denotes averaging over a set of pilot carrier frequencies.

In practical numerical computation of the estimation, a search method may be adopted wherein a search over all possible candidate values of $\phi$ is conducted to find the one that minimizes $J'(\phi)$. In the searching process, lookup table may be used to eliminate the complexity of trigonometric function calculation.

In addition, direct numerical solution of an equation may also be utilized to obtain the optimal solution, as follows. Differentiating the cost function and letting $t=\sin(\phi)$, one obtains the following equation (10) that the optimal solution must satisfy:

$$At^4+Bt^3+Ct^2+Dt+E=0 \qquad (10)$$

where $A=4|R_2|^2$, $B=8(R_{2r}R_{1r}-R_{2i}R_{1i})$, $C=4(|R_1|^2-|R_2|^2)$, $D=8R_{2r}R_{1i}-4R_{2i}R_{1r}$, and $E=R_{2r}^2-R_{1i}^2$.

In another embodiment, in case the pilot carriers have unequal-spacing placement, then let the spacings between three consecutive pilot carriers be $F_1$ and $F_2$, respectively, i.e. the estimated frequency responses at three consecutive pilot carriers are $\hat{H}(f)$, $\hat{H}(f+F_1)$, and $\hat{H}(f+(F_1+F_2))$. Then second-order differentiation can still be approximated using second-order difference. Under unequal spacings, the second-order difference is given by:

$$\frac{\partial^2 \overline{H}(f)}{\partial f^2} \approx \frac{F_1\hat{H}(f+F_1+F_2) - (F_1+F_2)\hat{H}(f+F_1) + F_2\hat{H}(f)}{\frac{1}{2}F_1F_2(F_1+F_2)} \qquad (11)$$

Substituting into cost function (7) yields $$J' = \left\langle \left|\frac{\partial^2 \overline{H}(f)}{\partial f^2}\right|^2 \right\rangle \qquad (12)$$
$$= C\Re\{C_2 R_2 W^{(F_1+F_2)\phi} - C_{21}R_{21}W^{F_2\phi} - C_1 R_1 W W^{F_1\phi}\}$$

where $R_2 = \langle\hat{H}(f+F_1+F_2)\hat{H}^*(f)\rangle$, $R_{21} = \langle\hat{H}(f+F_1+F_2)\hat{H}^*(f+F_1)\rangle$, $R_1 = \langle\hat{H}(f+F_1)\hat{H}^*(f)\rangle$, $C_2 = F_1 F_2$, $C_{21} = F_1(F_1+F_2)$, and $C_1 = F_2(F_1+F_2)$. The optimal angle $\phi$ corresponds to the optimal delay (also termed delay phase), and it can be solved by searching over all possible candidates of $\phi$ for the value that minimizes $J'(\phi)$.

Furthermore, in case the center-of-mass delay $t_{com}$ is used in place of $t_a$ for phase rotation as proposed by Hsieh and Wei, where note that Hsieh and Wei only considered equally spaced pilot carriers, then under unequal-spacing placement of pilot carriers, the center-of-mass delay can be estimated as equal-spacing pilot subcarrier pairs. With $F_k$ denoting the pilot carrier spacing of the k-th group, the estimation process is as follows:

1. Obtain the average autocorrelation for each group of equal-spacing pilot subcarrier pairs by calculating $R(F_k) = \langle H(f+F_k)H^*(f) \rangle$..

2. Obtain the optimal estimate of $t_{com}$ by a numerical method, where the cost function can be defined and described mathematically as follows:

$$\hat{t}_{com} = \arg\min J(\phi_{com});$$

$$J(\phi_{com}) = \sum_{k=1}^{K} |R(F_k) - R(0) W^{F_k \phi_{com}}|^2,$$

where $R(0) = \langle |H(f)|^2 \rangle$.. One approximate solution is $$\phi_{com} = \frac{\sum_{k=1}^{K} F_k \angle R(F_k)}{\sum_{k=1}^{K} F_k^2}$$

One can extend first-order, i.e., linear, inter/extra-polation to $N^{th}$-order polynomial inter/extra-polation (where N is any positive integer) via polynomial-theoretic derivation and analysis. The cost function for optimal delay parameter estimation can be found to be given by $$J' = \left\langle \left| \frac{\partial^{N+1} \overline{H}(f)}{\partial f^{N+1}} \right|^2 \right\rangle \quad (13)$$

To estimate the optimal delay, the (N+1)th-order differentiation can be approximated by (N+1)th-order difference and the mean square value of the latter can be used for the cost function of decision. In case of equally spaced pilot carriers, the present invention uses the estimated channel frequency responses $\hat{H}(f), \hat{H}(f+F), \ldots, \hat{H}(f+(N+1)F)$ that have been obtained for the pilot carriers to compute the above mean square value. For this, substituting equation (14) into the cost function (13) yields the cost function (15).

$$\frac{\partial^{N+1} \overline{H}(f)}{\partial f^{N+1}} \approx \frac{1}{F^2} \sum_{k=0}^{N+1} (-1)^k C_{N+1,k} \hat{H}(f+kF) \quad (14)$$

$$J' = \left\langle \left| \sum_{k=0}^{N+1} (-1)^k C_{N+1,k} \hat{H}(f+kF) \right|^2 \right\rangle \quad (15)$$

where $$C_{N+1,k} = \frac{k!(N+1-k)!}{(N+1)!}.$$

Expanding equation (15) yields the equivalent cost function:

$$J_N = \Re\left\{ \sum_{k=1}^{N+1} (-1)^k A_{N+1,k} e^{jk\phi} R_k \right\} \quad (16)$$

where $$A_{N+1,k} = \frac{2^{N+1}(2N+1)!!(N+1)!}{(N+1-k)!(N+1+k)!}$$

with n being the "double-factorial" of n, i.e. n!!=n(n−2)(n−4) . . . x where x=2 for even n and x=1 for odd n. For example, for first- to third-order polynomials, the respective cost functions are as follows:

$$J_1 = \Re\{e^{j2\phi} R_2 - 4e^{j\phi} R_1\}$$

$$J_2 = \Re\{-e^{j3\phi} R_3 + 6e^{j2\phi} R_2 - 15e^{j\phi} R_1\}$$

$$J_3 = \Re\{e^{j4\phi} R_4 - 8e^{j3\phi} R_3 + 28e^{j2\phi} R_2 - 56e^{j\phi} R_1\}$$

To obtain numerical solution of the equations, one may adopt a search method to find the optimal phase rotation or use a numerical method to solve the equation for the optimal rotation directly.

In case where pilot carriers have unequal-spacing placement, the above-mentioned notion of approximating differentiation with differencing can again be used to obtain the equivalent cost function, and the solution can be obtained by search or by a numerical method.

Therefore, even without regarding to the higher-order inter/extra-polation and the capability to handle unequally spaced pilot subcarriers of the present invention, but only considering its operation with linear inter/extra-polation under equally spaced pilots, the present invention has at least two following advantages compared to the scholarly proposal of Hsieh and Wei: (1) the estimated delay-phase rotation of the present invention is an estimation of the optimal value, yielding suboptimal phase-compensated interpolation results; (2) in case of relatively large channel delay spread, the performance of the suboptimal estimation of the present invention is better than the delay-phase estimation of the above-referenced scholarly proposal.

In another embodiment, the phase-rotated polynomial inter/extra-polation algorithm can be utilized in the downlink transmission of a WiMAX OFDMA system. A linear inter/extra-polation algorithm is herein taken as an example to illustrate the operation. In WiMAX OFDMA system, every downlink user channel is assigned to a major group, and every major group comprises multiple clusters. One cluster consists of fourteen consecutive subcarriers in an OFDMA symbol, and a user channel is distributed over an even number of clusters in the OFDMA symbols. FIG. 1 shows the configuration of data carriers and pilot carriers in the clusters in several consecutive OFDMA symbols. In addition to the structure of clusters, it also illustrates a scheme of channel estimation. Let H(t, k) denote the channel frequency response at subcarrier k in the symbol indexed t, and let the target symbols 10 comprise the second symbol 11 and third symbol 12. Then the illustrated scheme estimates the above-defined $R_1$ and $R_2$ with the channel frequency response estimates at the pilot carriers and then estimates the optimal delay phase. The steps of channel estimation algorithm include:

Step S1: make use of the pilot values to estimate the channel frequency responses at pilot carrier positions to obtain channel estimates for H(2,1), H(2,13), H(3,5), and H(3,9);

Step S2: linearly interpolate in time domain by using the pilot carrier channel estimates in respectively temporally immediately preceding and succeeding clusters to obtain the channel estimates for H(2,5), H(2,9), H(3,1), and H(3,13);

Step S3: calculate autocorrelation function values of channel frequency responses according to the above-mentioned equations for pilot carriers with equal-spacing placement;

Step S4: calculate an equivalent cost function from the autocorrelation function; and Step S5: optimize on the equivalent cost function to obtain a phase rotation amount corresponding to a delay shift and substitute the phase rotation amount into a polynomial inter/extra-polation to estimate channel frequency responses of at least one subcarriers in the transmission channel.

By theoretical analysis on the proposed phase-rotated linear inter/extra-polation estimation and conventional linear inter/extra-polation estimation, the present invention can achieve an average mean square channel estimation error given by:

$$\sigma_h^2 = 0.5130\sigma_n^2 + 0.4531Q + 0.75E\{J\} + 0.0833E\{J_X(1)\} \qquad (17)$$

where $$E\{J\} = 45.33\pi^4 E\left\{\sum_{l=1}^{L} |\alpha_l|^2 (t_a^* - t_l)^4\right\} / (N^4 T^4)$$

is the mean square value of frequency interpolation model error, $$E\{J_X(1)\} = 100\pi^4 E\left\{\sum_{l=1}^{L} |\alpha_l|^2 (t_a^* - t_l)^4\right\} / (N^4 T^4)$$

is the mean square value of frequency extrapolation model error, and $$Q = E\left|H(k, t+1) - \frac{1}{2}(H(k, t) + H(k, t+2))\right|^2$$

is the mean square value of model error of time domain linear inter/extra-polation, with $t_a^*$ being the delay shift obtained by the channel estimation algorithm.

In case the temporal variation of channel paths follows Jakes' model, the Q may be further simplified as $$Q \approx \frac{3\pi^4}{2} \sum_{l=1}^{L} E|\alpha_l|^2 f_l^4$$

where $f_l$ is the peak normalized Doppler frequency of l-th path.

Figure 3:
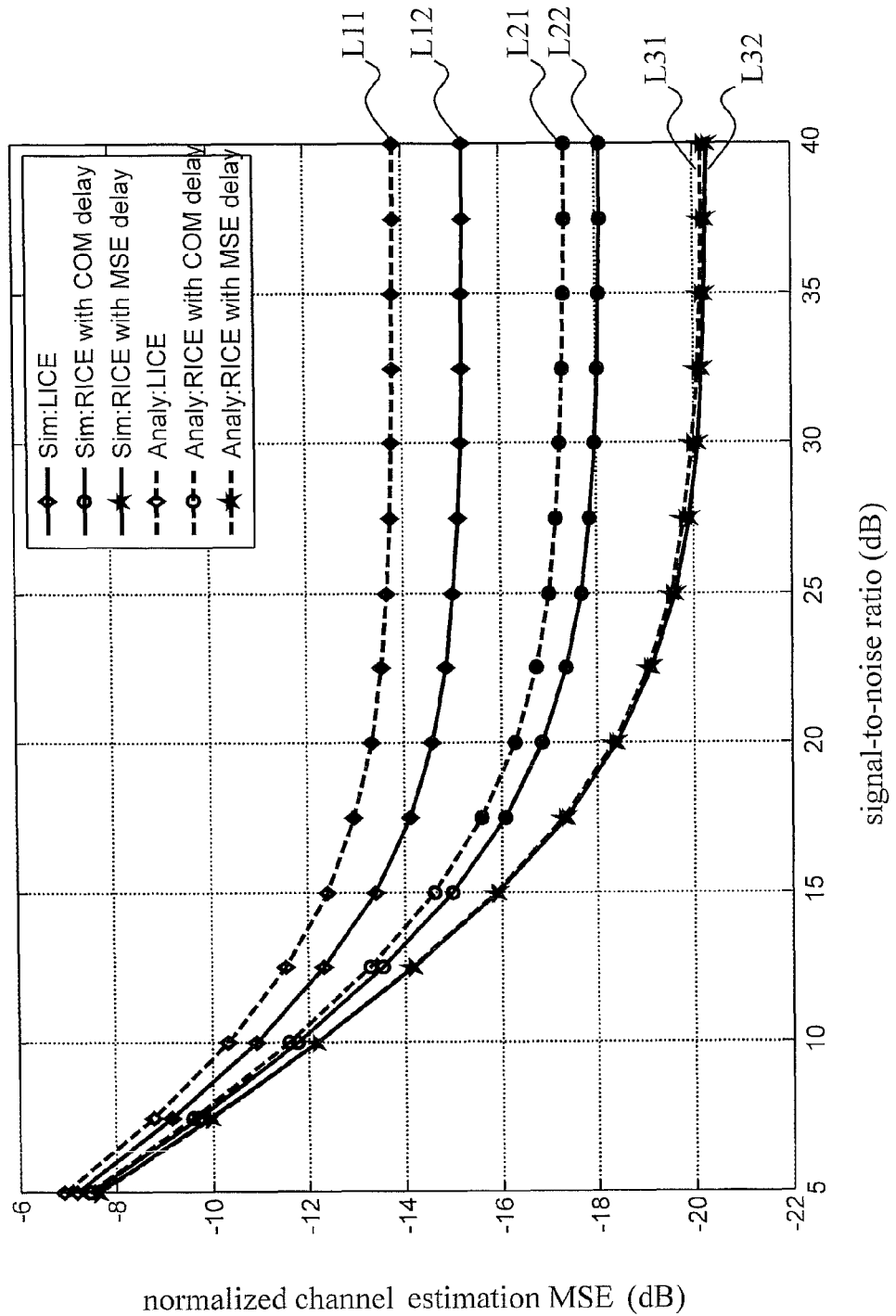
FIG. 3 is a comparison chart showing the simulated performance and its analytical approximation of one embodiment of the present invention and other methods.

FIG. 3 is a comparison chart showing normalized channel estimation MSE obtained via simulation and analytical approximation of the present invention and several different linear inter/extra-polation methods. The simulated system parameters are as follows: bandwidth of 10 MHz, center frequency at 2.5 GHz, 1024-point FFT (fast Fourier transform), with a major group comprising twelve clusters, and SUI-5 channel model. The original SUI channel model is a quasi-static system, but in order to consider mobile environments a Jakes channel model for 100 km/h of moving speed is used for each channel path. The root-mean-square (RMS) delay spread of SUI-5 is as high as 2.842 µs, i.e. about 32 samples of time spacing in 10-MHz bandwidth system. It is obvious that the phase-rotated inter/extra-polation with estimated optimal delay phase of the present invention still yields good performance in this severe delay condition (shown in curves L31 and L32 with star marks and dubbed "RICE with MSE delay" in the legend, where L32 depicts simulation results and L31 analytical approximation). However, typical linear inter/extra-polation (shown in curves L11 and L12 with diamond-sign marks and dubbed "LICE" in the legend, where L12 depicts simulation results and L11 analytical approximation) and Hsieh and Wei's method (shown in curves L21 and L22 with circle-sign marks and dubbed "RICE with COM delay" in the legend, where L22 depicts simulation results and L21 analytical approximation) are comparatively worse off.

Therefore, even without regarding to the higher-order inter/extra-polation and the capability to handle unequally spaced pilot subcarriers of the present invention, but only considering its operation with linear inter/extra-polation under equally spaced pilots, the present invention has at least the two following advantages compared to the delay-phase estimation of Hsieh and Wei: (1) the estimated delay-phase rotation of the present invention is an estimation of the optimal value, yielding suboptimal phase-compensated interpolation results; (2) in case of larger channel delay spread, the performance of the suboptimal estimation proposed by the present invention is better.

Since the present invention considers the phase-rotation effect as part of the channel responses, it has the following further advantages: (1) the phase rotation used can be explained in terms of a clearly formulated mathematical quality measure; (2) the phase rotation is absorbed in the inter/extra-polation weighting and there is no need to multiply a different amount of phase rotation for each subcarrier; the weight values do not vary with the subcarrier positions when pilot carriers have equal-spacing placement.

To sum up, the present invention adds a linear phase factor to polynomial intra/extra-polation, which corresponds to adding a delay (also called delay shift) in the time domain. Major contributions of the present invention include several algorithms to estimate the optimal delay phase factors so as to result in optimal phase-rotated polynomial inter/extra-polation. A direct application is in the downlink channel estimation of a WiMAX OFDMA communication system: for carriers organized into clusters, perform time-domain polynomial inter/extra-polation to obtain some channel frequency response estimates at pilot carrier positions; estimate the optimal delay phase parameter with the optimal delay estimation algorithm; and obtain the remaining channel frequency responses with phase-rotated inter/extra-polation algorithm in the frequency domain.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A method for channel estimation in a multicarrier communication system based on orthogonal frequency-division multiplexing (OFDM) or orthogonal frequency-division multiple access (OFDMA) technologies, which receives a signal and performs channel estimation over a transmission channel for the multicarrier communication system, comprising:

dividing multiple pilot carriers into a plurality of pilot carrier groups organized according to known carrier spacings;

calculating an autocorrelation function of channel frequency responses corresponding to the plurality of pilot carrier groups of known spacings by using the multiple pilot carriers;

calculating an equivalent cost function from the autocorrelation function, wherein the autocorrelation function is:

$$R(F_k) = \langle \hat{H}(f+F_k)\hat{H}^*(f) \rangle$$

where f denotes a pilot carrier frequency, k denotes a pilot carrier group, $F_k$ denotes pilot carrier spacing of k-th group, $\hat{H}$ denotes a channel frequency response estimate at a pilot carrier frequency, and $\langle \ \rangle$ denotes averaging over a set of pilot carrier frequencies;

optimizing with the equivalent cost function to obtain an amount of phase rotation corresponding to a delay shift; and substituting the amount of phase rotation into a polynomial inter/extra-polation to estimate channel frequency response for at least one subcarrier of the transmission channel.

2. A method for channel estimation in a multicarrier communication system as claimed in claim 1, wherein in case the pilot carriers observe equal-spacing placement, the equivalent cost function for delay phase optimization is given by:

$$J_N = \mathfrak{R}\left\{\sum_{k=1}^{N+1} (-1)^k A_{N+1,k} e^{jk\phi} R_k\right\}$$

where $R_k = R(F_k) = R(kF)$, F is the spacing in frequency domain of adjacent pilot carriers, $\mathfrak{R}\{\ \}$ denotes taking the real part of a quantity, $$A_{N+1,k} = \frac{2^{N+1}(2N+1)!!(N+1)!}{(N+1-k)!(N+1+k)!}, n!!$$

is the double-factorial of n, and N is the order of polynomial inter/extra-polation;

in case the pilot carriers observe unequal-spacing placement, the equivalent cost function is calculated by calculating the mean square value of unequal-spacing differencing.

3. A method for channel estimation in a multicarrier communication system as claimed in claim 2, wherein the step of optimizing with the equivalent cost function adopts a search method to obtain the optimal solution, and a pre-built trigonometric function table is used to lower the complexity of the search process.

4. A method for channel estimation in a multicarrier communication system as claimed in claim 2, wherein the step of optimizing with the equivalent cost function adopts a direct numerical method to obtain the optimal solution.

5. A method for channel estimation in a multicarrier communication system as claimed in claim 1, wherein the step of substituting the phase rotation amount into a polynomial inter/extra-polation is calculated by:

$$\hat{H}(k) = W^{t_a k} \sum_{n=0}^{N} C_{x_n,k} \widetilde{\hat{H}}(x_n)$$

where k denotes a subcarrier where the channel frequency response is to be estimated, $\hat{H}(k)$ is the estimated channel frequency response at subcarrier k, W is a phase-rotation factor, $t_a$ is the delay shift, N is the order of polynomial inter/extra-polation, $x_n$ is the position of a pilot carrier used in inter/extra-polation, $\widetilde{\hat{H}}(x_n) = W^{-t_a x_n}\hat{H}(x_n)$ with $\hat{H}(x_n)$ being a channel frequency response estimate at pilot carrier $x_n$, and $C_{x_n,k}$ is the inter/extra-polation coefficient.

6. A method for channel estimation in a multicarrier communication system as claimed in claim 5, wherein the numerical value of $C_{x_n,k}$ may be calculated with any mathematical formulas equivalent to the following formula of Vandermonde-matrix form:

$$C_{x_n,k} = \begin{bmatrix} 1 & k & \cdots & k^N \end{bmatrix} \begin{bmatrix} 1 & x_0 & \cdots & x_0^N \\ 1 & x_1 & \cdots & x_1^N \\ \vdots & \vdots & \ddots & \vdots \\ 1 & x_N & \cdots & x_N^N \end{bmatrix}^{-1}$$

or the following formula of Lagrange form:

$$C_{x_n,k} = \prod_{m=0, m\neq n}^{N} \frac{k - x_m}{x_n - x_m}.$$

7. A method for channel estimation in a multicarrier communication system as claimed in claim 1, wherein when using an inter/extra-polation of first order, i.e. a linear inter/extra-polation, the phase rotation amount is substituted into the calculation of the inter/extra-polation as:

$$\hat{H}(f+k) = \frac{F-k}{F} W^{t_a k}\hat{H}(f) + \frac{k}{F} W^{t_a(k-F)}\hat{H}(f+F)$$

where $\hat{H}(f)$ and $\hat{H}(f+F)$ are channel frequency response estimates at pilot carriers f and f+F, respectively, and $\hat{H}(f+k)$ is the estimated channel frequency response at a subcarrier position f+k.

8. A method for channel estimation in a multicarrier communication system, which receives a signal and performs downlink channel estimation over a transmission channel for a WiMAX (Worldwide Interoperability for Microwave Access) OFDMA (orthogonal frequency-division multiple access) system, comprising:

for M+2 consecutive OFDMA symbols, estimating channel frequency responses at positions of pilot carriers in each group of clusters possessing the same frequency-domain index in the M+2 OFDMA symbols by using pilot values there to obtain pilot carrier channel frequency response estimates, wherein M is a positive integer that can be chosen according to an operating condition;

performing time-domain linear interpolation in a pairwise manner using the pilot carrier channel frequency response estimates in a first and third, second and fourth, . . . , till the M-th and (M+2)-th OFDMA symbols, respectively, to form channel frequency response estimates at corresponding subcarriers in the second, third, . . . , till the (M+1)-th OFDMA symbols, and treating these channel frequency response estimates also as pilot carrier channel frequency response estimates;

selecting a part of or all of the clusters in the M+2 OFDMA symbols and calculating an autocorrelation function for N-th order polynomial inter/extra-polation by using the pilot carrier channel frequency response estimates within the selected clusters, wherein N is a positive integer that can be chosen according to the operating condition;

calculating an equivalent cost function from the autocorrelation function;

optimizing with the equivalent cost function to obtain an amount of phase rotation corresponding to a delay shift; and substituting the amount of phase rotation into a polynomial inter/extra-polation of N-th order to estimate channel frequency response for at least one subcarrier of the transmission channel.

9. A method for channel estimation in a multicarrier communication system as claimed in claim 8, wherein the autocorrelation function is:

$$R(F_k) = \langle \hat{H}(f+F_k)\hat{H}^*(f) \rangle$$

where f denotes a pilot carrier frequency, k denotes a pilot carrier group, $F_k$ denotes pilot carrier spacing of k-th group, denotes a channel frequency response estimate at a pilot carrier frequency, and $\langle\ \rangle$ denotes averaging over a set of pilot carrier frequencies.

10. A method for channel estimation in a multicarrier communication system as claimed in claim 8, wherein in case the pilot carriers observe equal-spacing placement, an equivalent cost function for delay phase optimization is given by:

$$J_N = \Re\left\{\sum_{k=1}^{N+1}(-1)^k A_{N+1,k} e^{jk\phi} R_k\right\}$$

where $R_k = R(F_k) = R(kF)$, F is the spacing in frequency domain of adjacent pilot carriers, $\Re\{\ \}$ denotes taking the real part of a quantity, $$A_{N+1,k} = \frac{2^{N+1}(2N+1)!!(N+1)!}{(N+1-k)!(N+1+k)!}, n!!$$

is the double-factorial of n, and N is the order of polynomial inter/extra-polation.

11. A method for channel estimation in a multicarrier communication system as claimed in claim 10, wherein the step of optimizing with the equivalent cost function adopts a search method to obtain the optimal solution, and a pre-built trigonometric function table is used to lower the complexity of the search process.

12. A method for channel estimation in a multicarrier communication system as claimed in claim 10, wherein the step of optimizing with the equivalent cost function adopts a direct numerical method to obtain the optimal solution.

13. A method for channel estimation in a multicarrier communication system as claimed in claim 8, wherein the step of substituting the phase rotation amount into a polynomial inter/extra-polation is calculated by:

$$\hat{H}(k) = W^{t_a k}\sum_{n=0}^{N} C_{x_n,k}\hat{\bar{H}}(x_n)$$

where k denotes a subcarrier where the channel frequency response is to be estimated, $\hat{H}(k)$ is the estimated channel frequency response at subcarrier k, W is a phase-rotation factor, $t_a$ is the delay shift, N is the order of polynomial inter/extra-polation, $x_n$ is the position of a pilot carrier used in inter/extra-polation, $\bar{H}(x_n) = W^{-t_a x_n}\hat{H}(x_n)$ with $\hat{H}(x_n)$ being a channel frequency response estimate at pilot carrier $x_n$, and $C_{x_n,k}$ is the inter/extra-polation coefficient.

14. A method for channel estimation in a multicarrier communication system as claimed in claim 13, wherein the numerical value of $C_{x_n,k}$ may be calculated with any mathematical formulas equivalent to the following formula of Vandermonde-matrix form:

$$C_{x_n,k} = \begin{bmatrix} 1 & k & \cdots & k^N \end{bmatrix}\begin{bmatrix} 1 & x_0 & \cdots & x_0^N \\ 1 & x_1 & \cdots & x_1^N \\ \vdots & \vdots & \ddots & \vdots \\ 1 & x_N & \cdots & x_N^N \end{bmatrix}^{-1}$$

or the following formula of Lagrange form:

$$C_{x_n,k} = \prod_{m=0,m\neq n}^{N}\frac{k-x_m}{x_n-x_m}.$$

15. A method for channel estimation in a multicarrier communication system as claimed in claim 8, wherein when using an inter/extra-polation of first order, i.e. a linear inter/extra-polation, the phase rotation amount is substituted into the calculation of the inter/extra-polation as:

$$\hat{H}(f+k) = \frac{F-k}{F}W^{t_a k}\hat{H}(f) + \frac{k}{F}W^{t_a(k-F)}\hat{H}(f+F)$$

where $\hat{H}(f)$ and $\hat{H}(f+F)$ are channel frequency response estimates at pilot carriers f and f+F, respectively, and $\hat{H}(f+k)$ is the estimated channel frequency response at a subcarrier position f+k.

\* \* \* \* \*